United States Patent [19]

Dunn

[11] Patent Number: 5,574,783
[45] Date of Patent: Nov. 12, 1996

[54] SYSTEM AND METHOD FOR PROVIDING COMPETITIVE ACCESS TELEPHONE SERVICE FOR TELEPHONES CONNECTED TO A REMOTE TERMINAL OF THE MONOPOLY SERVICE PROVIDER

[75] Inventor: James P. Dunn, Sandwich, Ill.

[73] Assignee: Lucent Technologies Inc., Murray Hill, N.J.

[21] Appl. No.: 561,996

[22] Filed: Nov. 22, 1995

[51] Int. Cl.[6] .......................... H04M 7/00; H04M 3/22; H04M 3/42
[52] U.S. Cl. .................. 379/230; 379/27; 379/207; 379/221; 379/231; 379/234; 379/334
[58] Field of Search .......................... 379/27, 201, 207, 379/219, 220, 221, 222, 224, 229, 230, 231, 232, 233, 234, 242, 333, 334, 335, 336, 337

[56] References Cited

U.S. PATENT DOCUMENTS

| | | | |
|---|---|---|---|
| 4,197,427 | 4/1980 | Hutcheson et al. | 379/334 X |
| 4,901,344 | 2/1990 | Monette et al. | 379/201 X |
| 5,287,344 | 2/1994 | Bye et al. | 379/334 X |
| 5,347,566 | 9/1994 | Law et al. | 379/333 X |
| 5,400,321 | 3/1995 | Nagato | 379/27 X |
| 5,440,626 | 8/1995 | Boyle et al. | 379/219 |
| 5,454,034 | 9/1995 | Martin | 379/272 X |
| 5,475,749 | 12/1995 | Akinpelu et al. | 379/207 X |
| 5,517,562 | 5/1996 | McConnell | 379/207 |

Primary Examiner—Krista M. Zele
Assistant Examiner—Harry S. Hong
Attorney, Agent, or Firm—Michael B. Johannesen

[57] ABSTRACT

A system for providing a competitive access provider controls specific lines in a remote terminal connected to a monopoly service provider connected directly from the remote terminal to a competitive access switch. In order to control the line or lines in the remote terminal, the competitive access provider switch sends signals via a signaling network to the monopoly service provider. In this manner, a competitive access provider may control a plurality of lines in a remote terminal without having to change a physical plant other than directing one or more DS 1 s or other trunks from the remote terminal to a host digital terminal on the competitive access provider network.

7 Claims, 6 Drawing Sheets

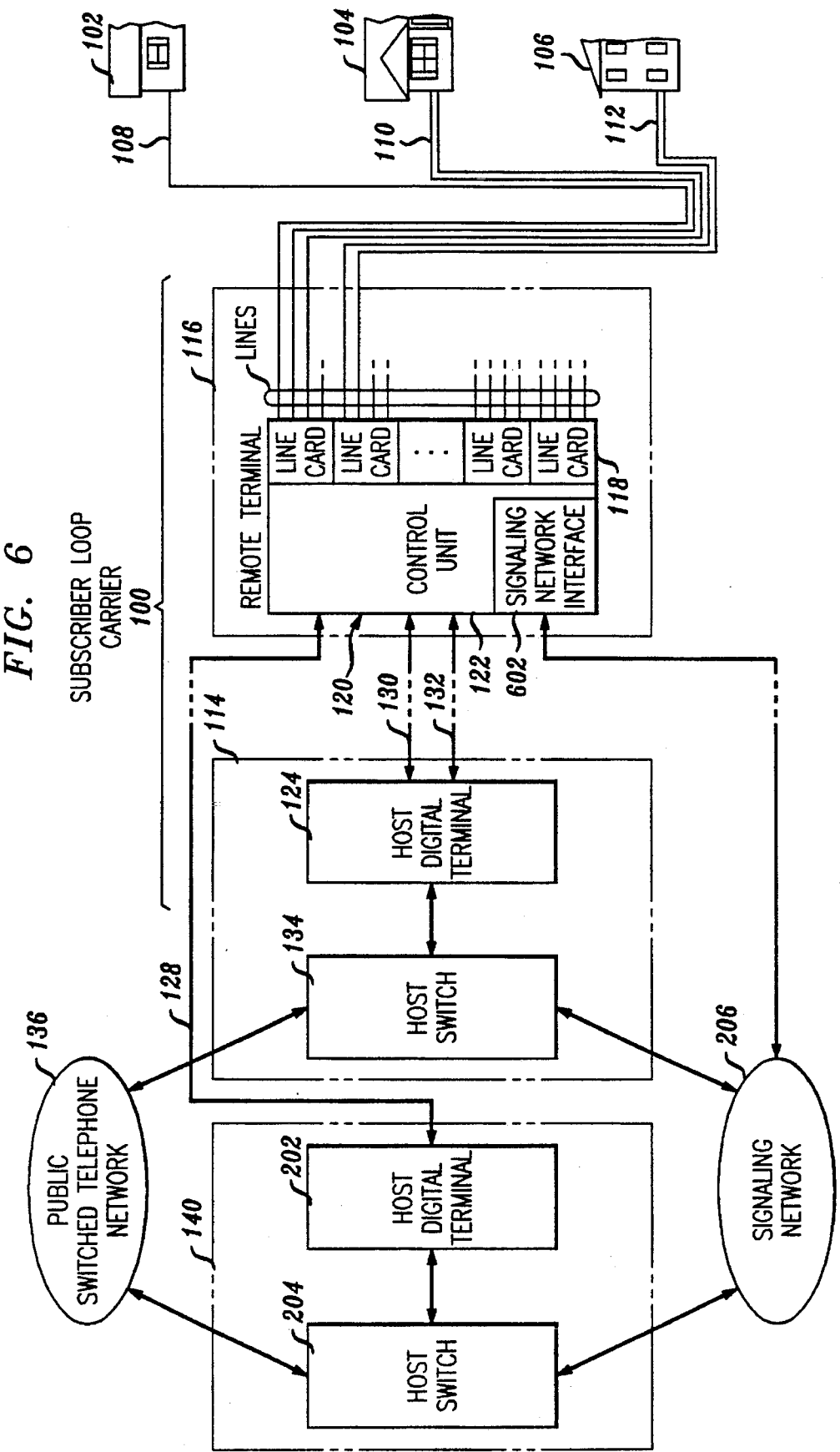

SYSTEM AND METHOD FOR PROVIDING COMPETITIVE ACCESS TELEPHONE SERVICE FOR TELEPHONES CONNECTED TO A REMOTE TERMINAL OF THE MONOPOLY SERVICE PROVIDER

TECHNICAL FIELD

This invention relates to the field of providing competitive access telephone service and, more specifically, to providing competitive access telephone service to those subscribers who are served by remote terminal.

BACKGROUND OF THE INVENTION

Because the local access telephone market is being deregulated, there is a need for the incumbent monopoly telephone service provider (the local phone company) to unbundle services and resources to make them available to competitive access providers. One area of such unbundling that is particularly complicated occurs when the consumer is served from a remote terminal (e.g., subscriber loop carrier), instead of a direct copper-wire pair. Subscriber loop carriers (SLCs) provide primary connection of the subscriber telephone to the public switched telephone network (PSTN) for clusters of subscribers. There are many thousands of SLCs used in both the United States and internationally. These SLCs are commonly used to provide telephone service in rural and suburban communities where direct connection to the telephone switching office for each individual subscriber would require a large number of long wire pairs, amplifiers, etc., but are also becoming more common in urban areas. In fact, many incumbent monopoly telephone service providers are using SLCs to reduce the cost of physical maintenance of the outside plant.

FIG. 1 illustrates a typical prior art SLC 100. SLC 100 is connected to a plurality of subscribers, herein illustrated as houses 102, 104, and 106 in a suburban or rural community via lines 108–112 respectively. SLCs are also used in urban areas, as mentioned above, such as high height and high density housing units.

SLC 100 comprises a central office portion 114 and a field or remote portion 116. The remote portion 116 of SLC 100 is housed on a pedestal or enclosure in proximity to the subscribers which it serves. The subscriber lines (copper pair or "tip and ring", as is known in the art) are connected to the remote portion 116 of SLC 100 at a plurality of line cards 118, as known in the art. The SLC line cards 118 are generally similar to line cards found in any prior art switching system and provide the BORSHT functionality of telephone service (battery, over voltage, ringing, supervision, hybrid, and testing, as is known in the art). These line cards are plugged into an optical network unit (ONU) 120, which receives and transmits signals to and from the line card, performs translations and prepares the signals for transmission to the central office 114. ONU 120 is controlled by control unit 122. A host digital terminal 124 at central office 114 is connected to the optical network via a plurality of facilities 128–132, which carry multiplexed signals from line cards 118, on 24 channels each (such facilities are commonly DS 1). Host digital terminal 124 is generally located at the switch portion 114 and is connected to a host switch 134. Host digital terminal 124 emulates copper pair appearance at the switch site and terminates the trunks on a special integration unit to the telephone switching system 134. Host switch 134 then can connect calls between SLC 100 and the public switch telephone network (PSTN) 136.

SLC 100 may be a SLC 96® as available from AT&T and described in Bell Laboratories Technical Journal, vol. 63, No. 10, Part 2, December, 1984. In some instances, the host digital terminal is fully integrated into a switch. It is illustrated here as being separate for clarity.

In most arrangements, there is a dedicated control channel 138 between host digital terminal 124 and control unit 122 of optical network 120. This control channel 138 is used to provide supervision, set up phone calls, etc., as is known in the art and described in the above reference. A test bus 142 is also provided between the host switch 134 and host digital terminal 124, and between host digital terminal 124 and remote terminal 116. Test bus 142 is used by craft at host switch 134 (or via a remote link to host switch 134, not shown but well known in the art) to test host digital terminal 124, and remote terminal 116 and lines, such as 108–112. Test bus 142 may be "looped back" at host digital terminal 124 and remote terminal 116 to provide test configuration actions for fault localization, as is known in the art.

In order to provide a competitive access provider switch with access to a subscriber loop carrier, there are several resources that must be "unbundled." First, a plurality of voice channels of the facility between the incumbent monopoly switch and the remote terminal must somehow be connected to the competitive access provider switch. Second, the competitive access provider switch 140 must have some access to control channel 138. Finally, there must be test access from the competitive access provider switch to remote terminal 122 for testing voice channels.

Since there are many talk channels (in the DS 1s) these can be easily unbundled and redirected to the competitive access provider switch by physically removing one or more trunks from the host digital terminal 124 and physically attaching them to a similar facility at the competitive access provider switch 140. Furthermore, test access to lines 108–112 can be achieved. using a variety of telemetry arrangements on the market today. Remote terminal 116, however, can only be tested from host switch 134.

Since there is only one control channel 138 and one test bus 142 per remote terminal 116, it is necessary that these facilities be shared with the competitive access provider switch 140. Such sharing is difficult because the control channel 138 is generally integrated into the switching equipment 134 of the monopoly service provider switching system 114, and is not designed for access by other switches. Also, the protocols used to control some remote terminals are proprietary, and only the switches made by a given manufacturer are capable of communicating with the control unit of the remote terminal. Competitive access service cannot be offered without the use of the control channel because it is used to report offhook and onhook conditions, alarms, etc., from the remote terminal for every line.

Therefore, a problem in the art is that there is no way to unbundle the control channel and test facilities from a monopoly telephone service provider so that a competitive access telephone service provider may control selected lines in a remote terminal on a comparably efficient basis.

SUMMARY OF THE INVENTION

This problem is solved and a technical advance is achieved in the art by a system and method wherein a competitive access provider may control specific lines in a remote terminal (for example, a subscriber loop carrier). According to this invention, one or more voice channels are connected directly from a remote terminal to competitive access switch. In order to control the line or lines in the remote terminal, the competitive access provider switch sends signals via a signaling network (such as a common channel signaling network) to the monopoly service provider switch to which the control channel is attached. This switch forwards the commands via the control channel to a control unit in the remote terminal which controls the line or lines according to the commands from the competitive access switch.

In one exemplary embodiment, when a line goes offhook in the remote terminal, that fact is noted at the monopoly provider switch and a database lookup is performed. The lookup determines that the line is controlled by the competitive access switch, and the monopoly provider switch sends a message through the signaling network to the competitive access provider switch. The competitive access switch then sends other control messages back through the signaling network, through the monopoly provider switch and to the remote terminal. In this manner, a competitive access provider may control one or more lines in a remote terminal without having to change a physical plant other than directing one or more trunks from the remote terminal to a host digital terminal on the competitive access provider switch.

Further, a competitive access switch can test the voice channels. The competitive access switch sends commands via signaling network, the host switch and the remote terminal to loop the channel (which is known in the art). The competitive access switch can then test the looped channel. The loopback is then released by a command from the competitive access switch by the same route as above. Thus, testing access of voice channels are connected between the competitive access switch and the remote terminal.

BRIEF DESCRIPTION OF THE DRAWING

A more complete understanding of the invention may be obtained from consideration of the following description in conjunction with the drawings in which:

FIG. 6 is a block diagram of a further embodiment of the present invention.

DETAILED DESCRIPTION

Figure 1:
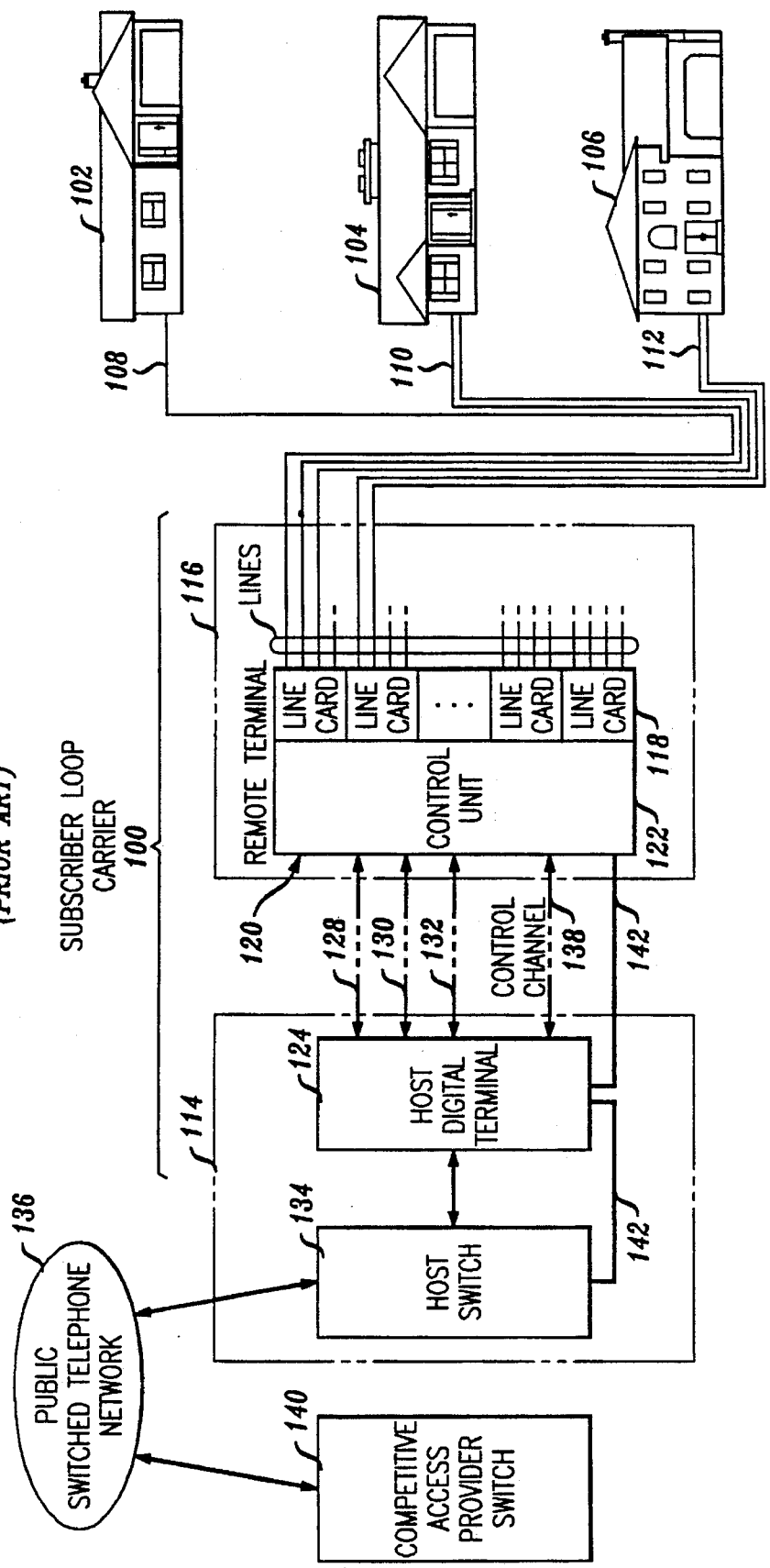
FIG. 1 is a block diagram of a prior art remote terminal and its connection to the public switch telephone network.
Figure 2:
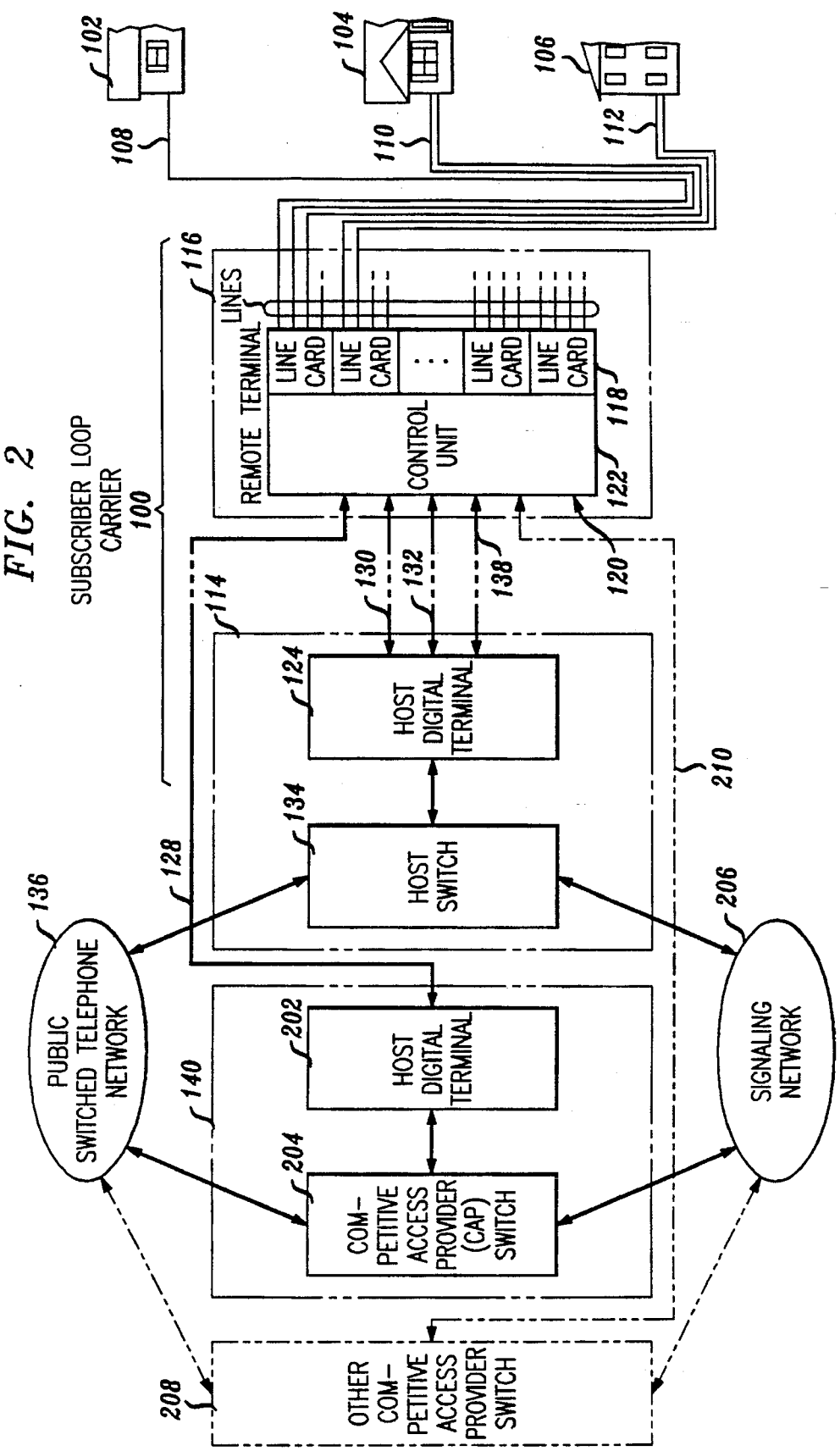
FIG. 2 is a block diagram of a remote terminal according to the present invention wherein one DS 1 or trunk is connected to a competitive access switch and both switches are connected via a signaling network.

FIG. 2 shows an illustrative embodiment of a competitive access provider (herein "CAP") switch 204 and a monopoly provider switch 134, both connected to a remote terminal (in this case a subscriber loop carrier or SLC 100). As in the prior art, host digital terminal 124 connects a plurality of trunks or DS 1 connections 130–132 to the control unit 122 of remote terminal 120. Host digital terminal 124 also provides a control channel 138 to control unit 122 of remote terminal 120. All control of line cards 118 and, of course, lines 108–110 is transferred by control channel 138.

According to an exemplary embodiment of this invention, CAP switch is also connected to control unit 122 via voice channels (DS 1) 128. DS 1 128 is connected to a host digital terminal 202 of CAP switch 140. As in the prior art, host digital terminal 202 is connected to a switch 204. CAP switch 204 processes calls on direct connections (not shown) as is known in the art, but also, according to the exemplary embodiment of this invention, processes calls for a plurality of subscriber lines in remote terminal 116 as well. CAP switch 204 is connected to signaling network 206, as is known in the art, to provide signaling between itself and other switching systems. Host switch 204 is also connected to the public switch telephone network 136 as is known in the art.

Therefore, when a call arrives from PSTN 136 for one of the subscriber lines served by CAP switch 140 (for example, line 108 at residence 102), CAP host switch 204 sends a message through signaling network 206 to host switch 134 in the controlling monopoly provider switch 114. Host switch 134 informs host digital terminal 124, which then determines if line 108 is busy. If line 108 is not busy, host digital terminal 124 causes control channel 138 to send a message to control unit 122 via control channel 138 to set up a call between line 108 and one of the channels on DS 1 128. When offhook on line 108 is detected., a message is sent on control channel 138 to host digital terminal 124, which reports the offhook condition to host switch 134. Such offhook condition is then sent, via signaling network 206, to CAP switch 140, which causes CAP switch 204 and host digital terminal 202 to set up a communications path between line 108 and PSTN 136.

When a call originates in one of the houses served by CAP switch 140, the telephone (not shown) in house 102 goes offhook, which is noted by one of the plurality of line cards 124 and dialtone is provided over line 108. Digits are then collected and sent through control unit 122 and control channel 138 to host digital terminal 124. Host digital terminal 124 sends an origination message with the received destination directory number to host switch 134, which then performs a database lookup as is known in the art and normally performs with every telephone call. In this exemplary embodiment, host switch 134 determines that CAP switch 140 provides service for line 108 and, therefore, sends a message through signaling network 206 to CAP switch 204 that line 108 requests service and for a specific dialed number. CAP switch 204 notifies host digital terminal 202 and sends messages either through the PSTN 136 or signaling network 206 to the destination telephone. A call path is then reserved between host digital terminal 204 and control unit 122 via one of the voice channels 128. If a call is completed to the destination telephone number, then the call path is set up from control unit 122 through one of the channels of voice channels 128 through host digital terminal 202, host switch 204, and out to the public switch telephone network 136.

This invention provides competitive access to lines on a remote terminal without having to revise the network extensively. Through use of the signaling network 206, which is currently utilized in most local exchange carriers (LECs), the only physical connection that has to be installed is a trunk connection between the existing remote terminal 116 and the host digital terminal 202 of CAP switch 140. Furthermore, there can be no confusion in commands at remote terminal 116 because only one host digital terminal 124 can access the control channel 138 to control unit 122. Thus, this invention provides an economical way to add competitive access providers to a local network without interrupting the control flow, which in many cases is proprietary to the host digital terminal control unit. Further, there may be other competitive access provider switches, such as 208 switches which are connected to control unit 128 by voice channels 210 (test channels not shown), such as 208, without departing from the scope of this invention.

Figure 3:
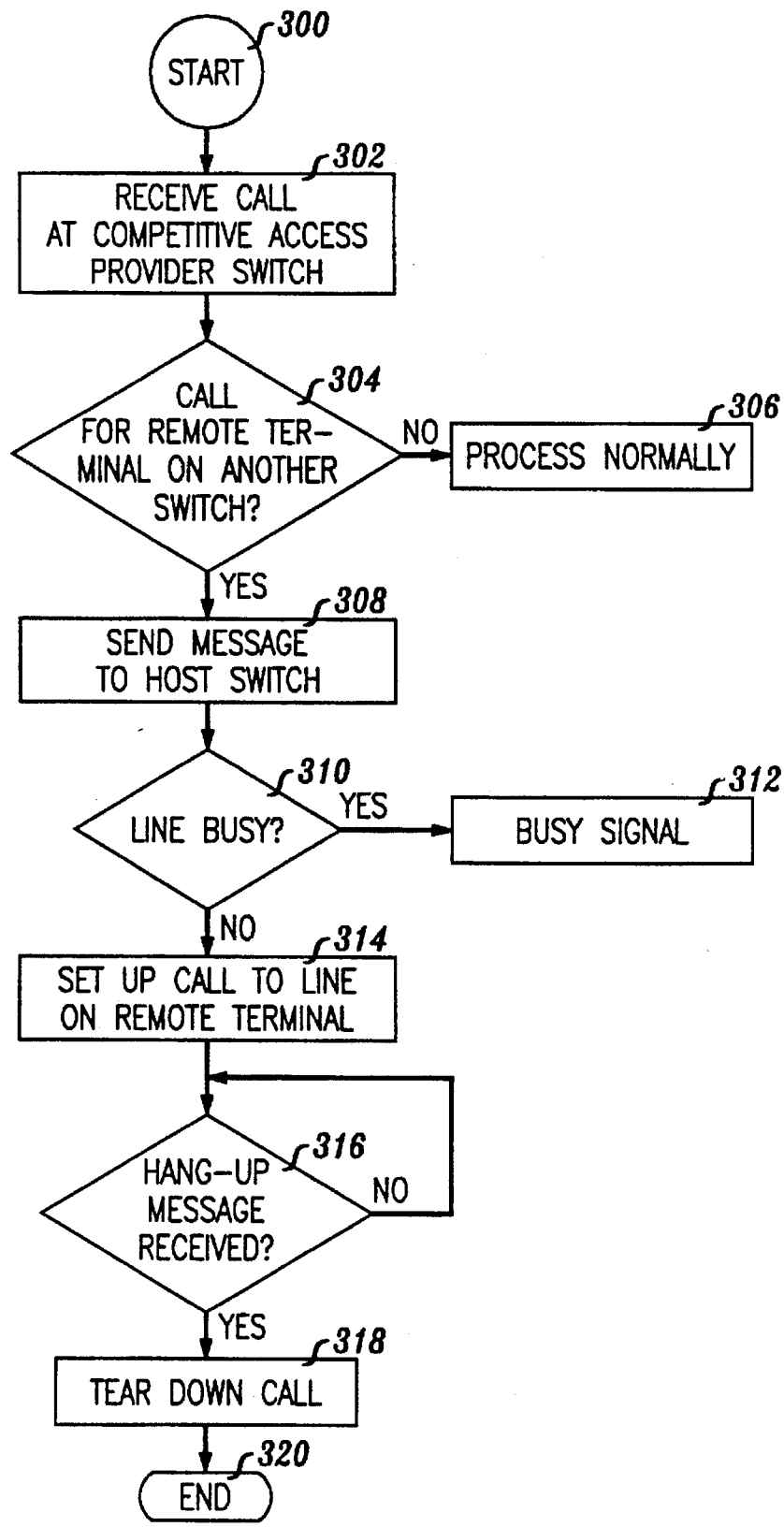
FIG. 3 is a flow chart showing the flow of control at the competitive access provider switch when a call is to be terminated to a remote terminal controlled by another switch.

Turning now to FIG. 3, a flow chart of control of call processing is shown in FIG. 3. Operations start in circle 300 and. proceed to action box 302, where a call is received at the CAP switch. A first determination in decision diamond 304 is made via a database lookup (as is usually performed in the art), to determine, among other things, if the call is terminated on a remote terminal. If the call is not terminated on the remote terminal or another switch, then the call is processed. normally in action box 306 (the implication being, of course, that the CAP switch 140 terminates the call to a line directly connected to it or directly to a remote terminal, which the host digital terminal 202 controls directly).

If, in decision diamond 304, the call is for a remote terminal on another switch, then processing proceeds to action box 308, where a message is sent to the host switch, indicating the DN and the line identification (and other information such as caller ID information) needed for completing the call. A determination is made by host switch 121 if the line is busy. If the line is busy, then processing proceeds to box 312, where a busy signal is returned to the incoming caller.

If the line is not busy in decision diamond 310, then channels, etc., are reserved to a terminating line and ringing is provided to the terminating line in box 314. Processing then waits at decision diamond 316 for a hangup message from either party. When the hangup message is received, processing continues to tear down the call by freeing up resources in action box 318 and processing ends at circle 320.

Figure 4:
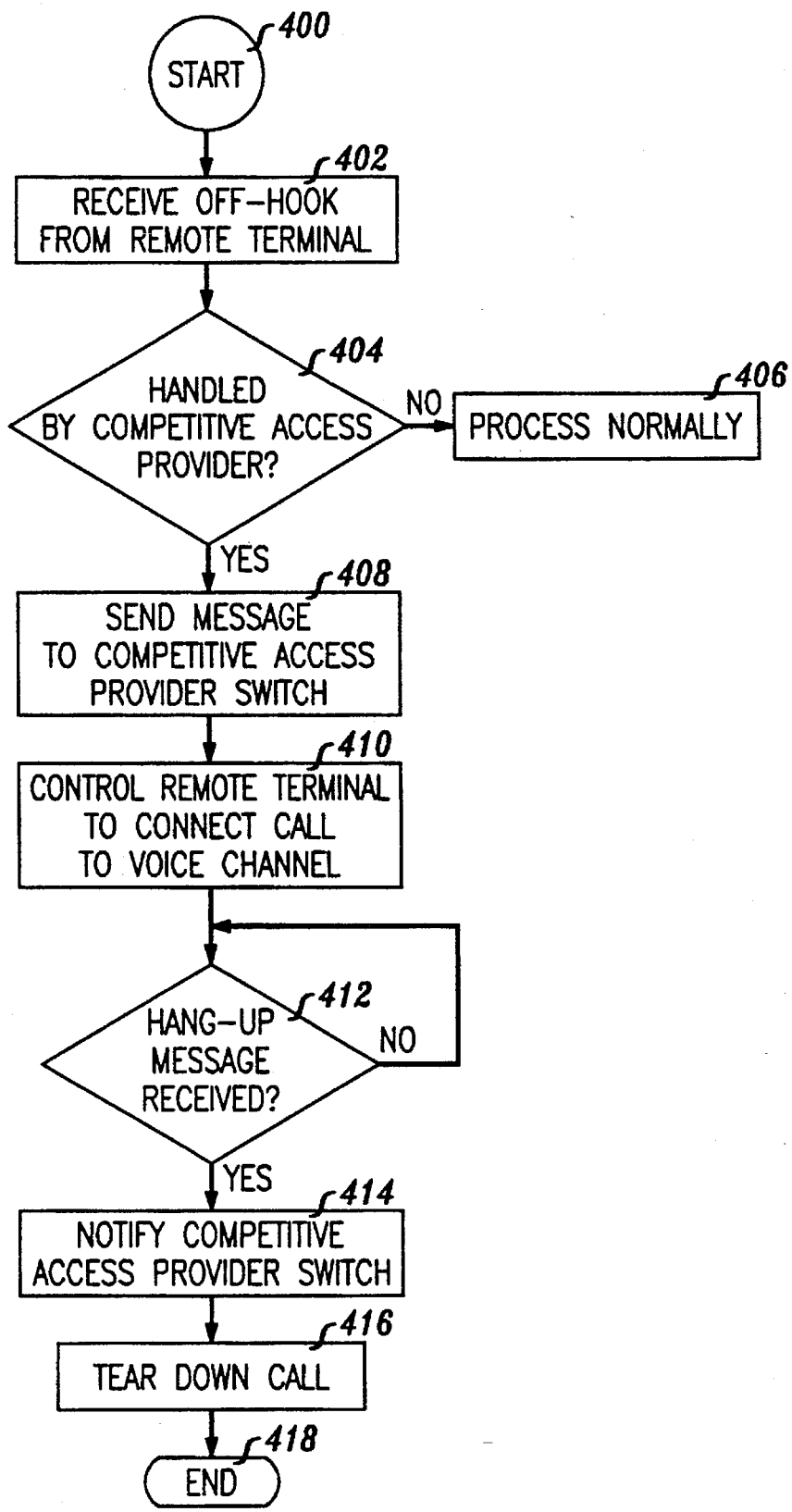
FIG. 4 is a flow chart showing the actions at the host switch when line controlled by a competitive access provider goes offhook.

Turning now to FIG. 4, a call flow for call origination is shown. Processing starts in circle 400 and proceeds to action box 402 where the remote terminal receives an offhook signal from a line 108 associated with a telephone, for example, in house 102. The remote terminal control unit 122 notifies the host switch 134 via the host digital terminal 124, which then makes a decision whether the call is to be handled by itself or by a CAP switch in decision diamond 404. If the call is to be handled by the host switch, then the call is processed normally in box 406. If, in decision diamond 404, a call is handled by a CAP switch, then processing continues to action box 408 where a message is sent to the competitive access provider, including the dialed number.

The CAP host switch 140 receives this message and causes CAP host digital terminal 204 to reserve a channel and by sending a message back to host switch 114. This message may ask for additional digits or other action by the subscriber to activate advanced features (i.e., centrex, conference, etc.). The message is forwarded to host digital terminal 124 causes control unit 122 to reserve the same voice channel on the DS 1. If a call is completed, processing waits at decision diamond 158 until a hangup message is received from one or the other of the parties.

Once a hangup message is received in decision diamond 412, then processing proceeds to action box 414 where the control unit 122 notifies the host digital terminal 124 via control channel 138 (if the telephone in house 102 hangs up first) host switch 134 notifies CAP host switch 204 via signaling network 206 and message CAP host switch 204 causes host digital terminal 202 to tear down the call. The call path is then torn down in action box 416 and processing ends at circle 418.

Figure 5:
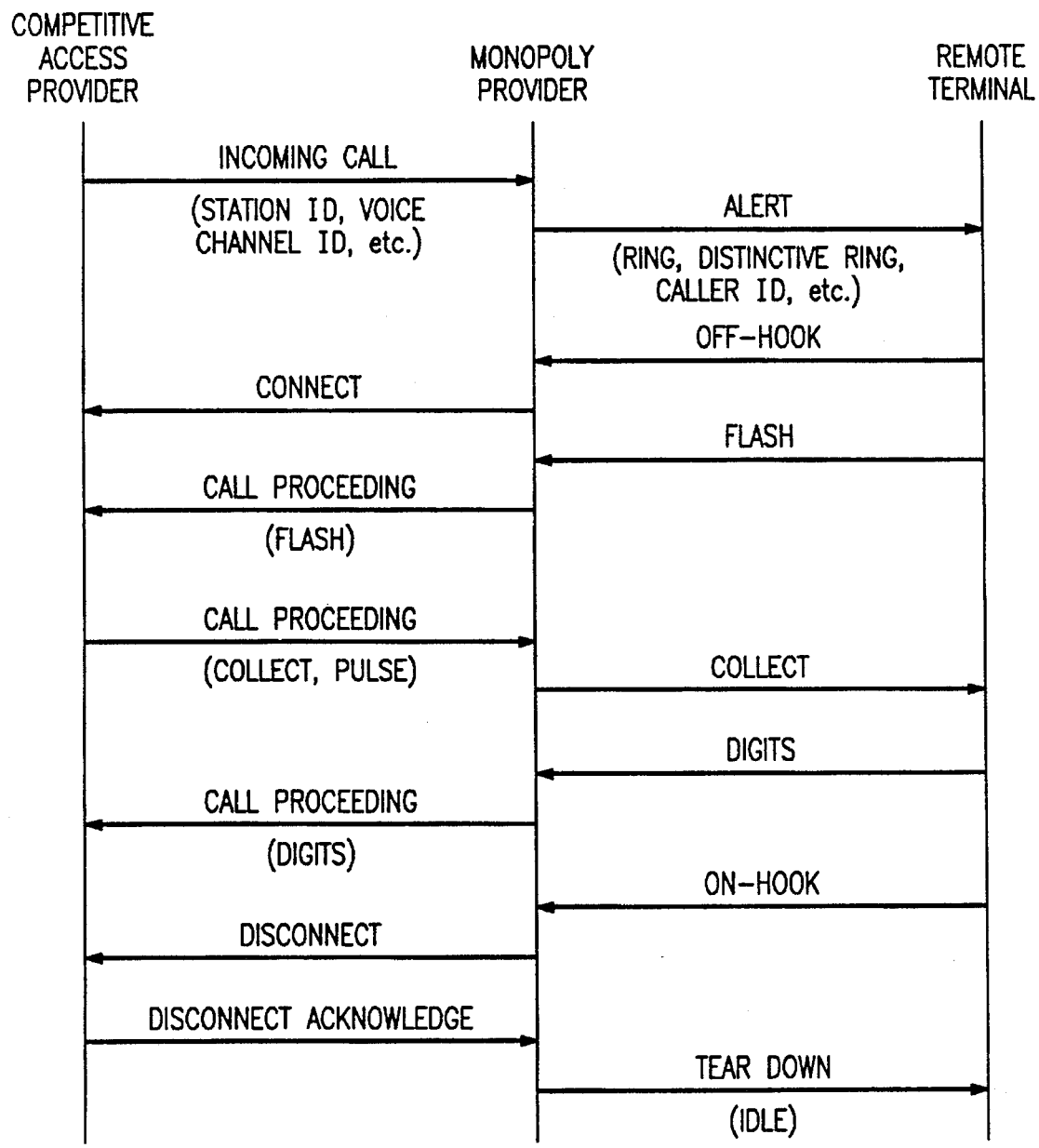
FIG. 5 shows message flow through the signaling network for such operations.

FIG. 5 illustrates a call flow of messages from the competitive access provider to the monopoly provider and back to the remote terminal in a typical call handling scenario (including a feature activation). The first message from the competitive access provider is the incoming call message which includes the station ID, voice channel ID, etc. This message is sent to the monopoly provider which then sends an alert message to the remote terminal. Such alert message includes distinctive ringing, caller ID, etc. Next, the remote terminal sends an offhook message to the monopoly provider which forwards the message to the competitive access provider as a connect message.

In a scenario that includes using special features, a switch hook flash is received from a remote terminal monopoly provider switch. A call proceeding message is sent to the competitive access provider, including a notification of the switch hook flash. A "call proceeding" message is then sent back to the monopoly provider, including a request to collect pulse or whatever else is necessary. The monopoly provider then sends the collect, or whatever is necessary, to the remote terminal which responds by collecting digits, in this particular scenario. The monopoly provider sends a call proceeding message to the competitive access provider over the signaling network switch message, including the digits. The CAP switch may play an announcement or prompt and collect digits such as DTMF or place the current call on hold, depending on the particular feature involved.

Eventually, an onhook signal is received from remote terminal which causes a disconnect message to be sent from the monopoly provider to the competitive access provider. The competitive access provider then sends a disconnect acknowledge message to the monopoly provider switch which sends a tear down message to the remote terminal.

Turning now to FIG. 6, a further embodiment of this invention is shown. In this configuration, monopoly provider switch 128, competitive access switch 140, and control unit of remote terminal 120 are all connected to signaling network 206. In this embodiment, control unit 120 requires a signal processing unit 602 in order to connect to signaling network 206 and performs the protocol, translation, etc., necessary to make the messages understandable to control unit 120. In this scenario, CAP switch 140 may send signaling messages via signaling network 206 directly to remote terminal 116 without having to pass the messages through monopoly provider switch 128. This alternative is, however, more expensive, because further intelligence has to be built into control unit 120, which is now non-existent. Furthermore, this intelligence is not shared among remote terminals; it is reflected at each remote terminal. Furthermore, a second connection from outside of the current physical plant must be added between signaling network 206 and remote terminal 120. However, this scenario does add flexibility to the control of remote terminal 116 by competitive access providers, but does not solve the testing problem since the testing controller is in switch 128.

It is to be understood that the above-described embodiments are merely illustrative principles of the invention and that many variations may be devised by those skilled in the art without departing from the scope of this invention. It is, therefore, intended that such variations be included within the scope of the pending claims.

The invention claimed is:

1. In a local telephone network, a system for providing competitive access to a remote terminal connected to a plurality of lines, said remote terminal being controlled by a monopoly provider switch for controlling said plurality of lines at said remote terminal, said local network including a signaling network, said system comprising:

a competitive access provider (CAP) switch, said CAP switch having facilities for remote terminals, said CAP switch being connected to said signaling network;

said remote terminal being connected to said CAP switch by one or more trunks;

said CAP switch having means for sending messages to said monopoly provider switch via said signaling network in order to control said lines served by said CAP switch; and said monopoly provider switch including means for determining which switch serves a particular line, and means responsive to said messages from said CAP switch to control said remote terminal according to said messages.

2. A system in accordance with claim 1 wherein said CAP switch comprises a plurality of CAP switches connected to said remote terminal and said signaling network, so that said monopoly provider switch is responsive to said plurality of CAP switches to control said remote terminal.

3. A system in accordance with claim 1 wherein said one or more trunks comprise DS1s.

4. A system in accordance with claim 1 wherein said remote terminal comprises a subscriber loop carrier.

5. A system in accordance with claim 1 wherein said remote terminal is connected to a plurality of telephone lines and said CAP switch controls a predetermined number of said lines.

6. A method for completing a call in a local switching network from a competitive access provider (CAP) switch to a remote terminal, said local switching network including at least one switch connected to said remote terminal, said remote terminal receiving operational commands exclusively from said switch, said competitive access provider (CAP) switch connected by one or more trunks to said remote terminal, said remote terminal being connected to a plurality of lines, and said local switching network including a signaling network to which both said switch and said CAP switch are connected, said method comprising the steps of:

receiving a call at said CAP switch for a predetermined line at said remote terminal;

said CAP switch sending a signaling message over said signaling network to said switch to determine the state of said line at said remote terminal;

said switch determining said state of said line and sending a status message to said CAP switch over said signaling channel;

if said line is not busy, said CAP switch sending a signaling message to said switch to reserve facilities, including a channel on said one or more trunks, in order to set up a call path from said CAP switch to said remote terminal; and completing said call from said CAP switch to said remote terminal.

7. A method for completing a call in a local switching network from a remote terminal through a competitive access provider (CAP) switch, said local switching network including at least one switch connected to said remote terminal, said remote terminal receiving operational commands over a control channel exclusively from said switch, said competitive access provider (CAP) switch connected by one or more trunks to said remote terminal, said remote terminal being connected to a plurality of lines, and said local switching network including a signaling network to which both said switch and said CAP switch are connected, said method comprising the steps of:

receiving a call service request from a line at said remote terminal;

said remote terminal sending a request over said control channel to said switch to determine which of said switch and said CAP switch serves said line;

said switch determining that said line is served by said CAP switch and said switch sending a signaling message over said signaling network to said CAP;

said remote terminal determining a destination directory number (DN) and sending said DN to said switch, which forwards said DN to said CAP switch over said signaling network;

said CAP switch setting up a call path to said DN and sending a signaling message to said switch to reserve facilities, including a channel on said one or more trunks, in order to set up a call path from said DN to said remote terminal line; and completing said call from said DN through said CAP switch to said remote terminal line.

\* \* \* \* \*